(12) United States Patent
Yang et al.

(10) Patent No.: US 10,689,877 B2
(45) Date of Patent: Jun. 23, 2020

(54) MULTIPLE ROD LINKAGE STRUCTURE AND TENT WITH SUCH MULTIPLE ROD LINKAGE STRUCTURE

(71) Applicant: WEIZI E-COMMERCE (SHANGHAI) CO., LTD., Shanghai (CN)

(72) Inventors: Shengyong Yang, Shanghai (CN); Jing Bian, Shanghai (CN)

(73) Assignee: Weizi E-Commerce (Shanghai) Co., Ltd., Shanghai (CN)

( * ) Notice: Subject to any disclaimer, the term of this patent is extended or adjusted under 35 U.S.C. 154(b) by 553 days.

(21) Appl. No.: 15/522,291

(22) PCT Filed: Feb. 18, 2017

(86) PCT No.: PCT/CN2017/074023
§ 371 (c)(1),
(2) Date: Apr. 27, 2017

(87) PCT Pub. No.: WO2018/090498
PCT Pub. Date: May 24, 2018

(65) Prior Publication Data
US 2020/0018088 A1    Jan. 16, 2020

(30) Foreign Application Priority Data
Nov. 17, 2016  (CN) .......................... 2016 1 10141113

(51) Int. Cl.
*E04H 15/46* (2006.01)
*F16B 7/04* (2006.01)
(Continued)

(52) U.S. Cl.
CPC ............. *E04H 15/46* (2013.01); *E04H 15/50* (2013.01); *E04H 15/52* (2013.01); *E04H 15/64* (2013.01);
(Continued)

(58) Field of Classification Search
CPC ....... E04H 15/46; E04H 15/60; F16B 7/0413; F16B 7/182
See application file for complete search history.

(56) References Cited

U.S. PATENT DOCUMENTS 2,645,509 A * 7/1953 Valenta ..................... E04G 7/20
403/297
3,547,475 A * 12/1970 Gingher ................ F16B 7/0413
403/297
(Continued)

FOREIGN PATENT DOCUMENTS

CN 205604835 9/2016
DE 2949814 A1 * 7/1980 ........... E04B 1/5831

*Primary Examiner* — Noah Chandler Hawk
(74) *Attorney, Agent, or Firm* — JCIPRNET

(57) ABSTRACT

A multiple rod linkage structure includes at least a first rod piece and a second rod piece which are muff-coupled. The first rod piece having a rod opening end sleeved within the second rod piece, and a rod strip opening being opened on a sidewall of the rod opening end. A locking element is connected between the first rod piece and the second rod piece, movably passes through a sidewall of the second rod piece and a sidewall of the first rod piece from outside to inside, is screw-thread fitted with a sidewall of the first rod piece, and then presses against another sidewall of the first rod piece. A tent uses the multiple rod linkage structure as a beam and/or a top rod.

10 Claims, 17 Drawing Sheets

(51) Int. Cl.
*E04H 15/50* (2006.01)
*E04H 15/52* (2006.01)
*E04H 15/64* (2006.01)
E04B 1/19 (2006.01)
F16B 7/18 (2006.01)

(52) U.S. Cl.
CPC .... *F16B 7/0413* (2013.01); *E04B 2001/1924* (2013.01); *F16B 7/18* (2013.01)

(56) References Cited

U.S. PATENT DOCUMENTS

| | | | | |
|---|---|---|---|---|
| 5,076,031 | A * | 12/1991 | Hancock | E04H 15/18 135/122 |
| 5,203,135 | A * | 4/1993 | Bastian | F16B 7/0413 403/292 |
| 6,216,413 | B1 * | 4/2001 | Lapointe | G09F 7/18 248/548 |
| 6,722,810 | B1 * | 4/2004 | Tachikawa | F16B 7/0413 403/109.1 |
| 6,874,971 | B2 * | 4/2005 | Albaugh | F16B 2/04 403/297 |
| 8,333,531 | B1 * | 12/2012 | Wei | A63B 21/1681 403/297 |
| 9,968,212 | B1 * | 5/2018 | Lundmark | A47H 1/022 1/22 |
| 2011/0001315 | A1 * | 1/2011 | Fischer | E04H 15/60 285/31 |
| 2016/0258182 | A1 * | 9/2016 | Xie | E04H 15/34 |

* cited by examiner

US 10,689,877 B2

MULTIPLE ROD LINKAGE STRUCTURE AND TENT WITH SUCH MULTIPLE ROD LINKAGE STRUCTURE

CROSS-REFERENCE TO RELATED APPLICATION

This application is a 371 application of an international PCT application serial no. PCT/CN2017/074023, filed on Feb. 18, 2017, which claims priority to and the benefit of China Patent Application No. CN2016110141113, filed on Nov. 17, 2016, the disclosures of which are incorporated herein by reference in its entirety.

TECHNICAL FIELD OF THE INVENTION

The present disclosure relates to tentage, in particular to a multiple rod linkage structure used in assembly tentage and a tent with such multiple rod linkage structure.

BACKGROUND OF THE INVENTION

Tentage is mainly built in the outdoors, for shelter from wind, rain and sunshine or temporary living. The structure of tent generally includes covering fabric, a top support and stand columns, and for convenient transport and assembly, the top supports in the existing tents almost employ foldable structures.

In tents with foldable structures, if the beam employs a foldable structure, the strength and rigidity may be insufficient, resulting in poor support. In some larger tents, the beams are suffered from a relatively large force and easily broken. If the beams use single rod pieces, more space is occupied for packaging, resulting in troubles in transport and storage.

In the prior art, in order to solve the problem that the splicing strength of multiple beams is small, Chinese utility model patent CN205604835U discloses a beam splicing mechanism for tentage, which achieves the splicing of the left and right beams via the fit of a vertical plug pin and a vertical plug seat. But it requires higher level for manufacturing the structures of the vertical plug pin and the vertical plug seat, and when the two have a too large fit clearance, the plug pin is prone to deflect a certain degree, which goes against the splicing of two sections of beams, resulting in that the overall frame of the tent is unstable.

SUMMARY OF THE INVENTION

For this purpose, in order to overcome the defects of the prior art, the first object of the present disclosure is to provide a multiple rod linkage structure with more stable structure.

To achieve the above mentioned purpose, firstly, the present disclosure provides a multiple rod linkage structure comprising at least a first rod piece and a second rod piece which are muff-coupled, the first rod piece having a rod opening end sleeved within the second rod piece, and a rod strip opening being opened on a sidewall of the rod opening end; a locking element is connected between the first rod piece and the second rod piece, movably passes through a sidewall of the second rod piece and a sidewall of the first rod piece from outside to inside, is screw-thread fitted with a sidewall of the first rod piece, and then presses against another sidewall of the first rod piece.

Preferably, both the first rod piece and the second rod piece are rectangular tubes, the number of the rod strip openings is two, and the two rod strip openings divides the sidewall of the rod opening end into a first U-shaped edge part and a second U-shaped edge part which are opposite.

More preferably, the locking element passes through the first U-shaped edge part along a direction parallel to a sidewall of the rectangular tube and thereafter presses against the second U-shaped edge part.

As another preferable kind of connection, the locking element passes through the first U-shaped edge part along a diagonal direction of the rectangular tube and thereafter presses against the second U-shaped edge part.

Wherein, both the first rod piece and the second rod piece are in groups of two, the two first rod pieces in the same group are provided in parallel and fixedly connected via at least two upright rods, and the two second rod pieces in the same group are provided in parallel and fixedly connected via at least two upright rods.

In a specific embodiment, the locking element is a bolt.

In the multiple rod linkage structure of the present disclosure, after the first rod piece and the second rod piece are muff-coupled, the locking element distends the rod opening end of the first rod piece outwards such that the first rod piece and the second rod piece are fixed together tightly, and it can be ensure that the first rod piece and the second rod piece remain linear in the length direction, with greater strength and not easy to be bent or broken off. And this multiple rod linkage structure has a low manufacturing cost, and is more convenient for installing and operating.

The second object of the present disclosure is to provide a tent comprising at least three stand columns, a beam connected between two stand columns, a top tent frame fixed on the stand columns and the beam, and covering fabric, the beam employs the multiple rod linkage structure foregoing described.

Preferably, the stand column is stretchable stand column, and the stretchable stand column comprises an inner tube and outer tube which are muff-coupled, as well as a locking mechanism for fixing the inner tube and the outer tube together; the inner tube has a stand rod opening end inserted within the outer tube, and a stand column strip opening extending to an opening edge is opened on a sidewall of the inner tube; the locking mechanism comprises a screw distending a sidewall of the stand column opening end outwards, a first stop block and a second stop block are fixedly provided on two sides of the sidewall of the stand column opening end respectively, the screw is movably connected between the first stop block and the second stop block along its own axial direction, and at least one of the first stop block and the second stop block is connected with the thread of the screw; operating holes corresponding to the same end of the screw are opened on sidewalls of the inner tube and the outer tube respectively, and an operating part is provided at least on one end portion of the screw corresponding to the operating holes.

The stand column strip opening is opened on the sidewall of the stand column opening end such that the sidewall of the stand column opening end has a certain range of motion in the radial direction, and on this basis, the sidewall of the stand column opening end may be distended outwards or contracted inwards in a certain degree under the function of the screw. Due to that after being pressed tightly, the inner tube and the outer tube are of surface-to-surface contact, with relatively greater friction force, and thus more stable, and having a greater bearing capacity.

In specific embodiments, there are four stretchable stand columns, two stretchable stand columns being connected via a beam to form a cubic frame. The top support is fixed on the cubic frame formed by the stretchable stand columns and the beams.

After the stretchable stand column stretches to a certain length, the opening end of the inner tube is distended outwards by twisting the screw via a tool passing through the operating hole, the distended opening end of the inner tube presses against the outer tube such that the inner tube and the outer tube are fitted tightly and fixed together; due to that the inner tube and the outer tube are fixedly together tightly after they are pressed against by the screw, and there is relatively great friction force between the appressed surfaces of the two, resulting in more stable structure and more greater bearing capacity of the stretchable stand column, which can ensure that the stretchable stand column has more stable supporting effect.

The present disclosure further provides a tent comprising at least three stand columns, a beam connected between two stand columns, a top tent frame fixed on the stand columns and the beam, and covering fabric, wherein, the top tent frame comprises a top connector and a plurality of top rods connected to the top connector, and both the beam and the top rods employ the multiple rod linkage structure foregoing described.

Compared to the prior art, the beam and the top rods in the tent of the present disclosure may employ the multiple rod linkage structure, with more stable structure, more convenient for installation, and smaller packaging volume after being disassembled.

DETAILED DESCRIPTION OF EXEMPLARY EMBODIMENTS

In the following, the preferable embodiments of the present disclosure are explained in detail combining with the accompanying drawings.

Embodiment 1

Referring to FIGS. 1-4, a multiple rod linkage structure of the present embodiment, comprises a first rod piece 301, a second rod piece 302 and a third rod piece 303, two ends of the second rod piece 302 being muff-coupled with the first rod piece 301 and the third rod piece 303, respectively.

At the right end of the second rod piece 302, the first rod piece 301 has a rod opening end 3011 sleeved within the second rod piece 302, and a rod strip opening 3012 is opened on a sidewall of the rod opening end 3011; a locking element 304 is connected between the first rod piece 301 and the second rod piece 302. After the rod strip opening 3012 is opened, the rod strip opening 3012 divides the opening end 3011 of the first rod piece 301 into at least two sidewalls, and the two sidewalls may be stretched out and drawn back in a certain degree.

Figure 1:
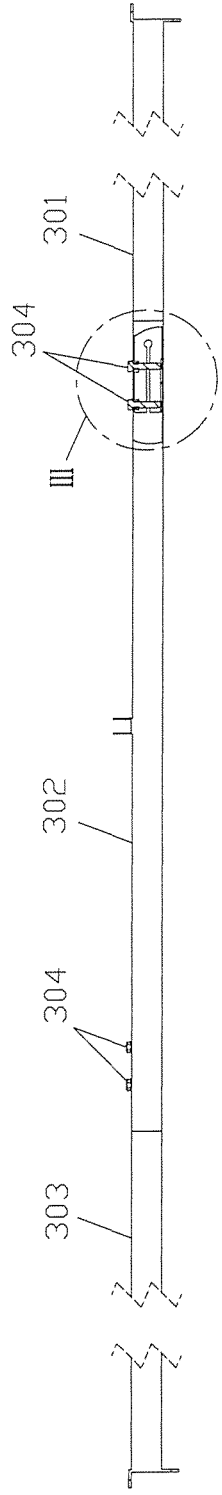
FIG. 1 is a main view of a multiple rod linkage structure of Embodiment 1.
Figure 2:
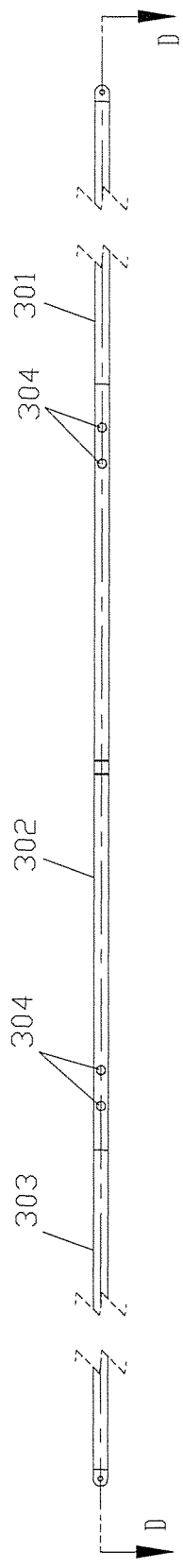
FIG. 2 is a top view of a multiple rod linkage structure of Embodiment 1.
Figure 3:
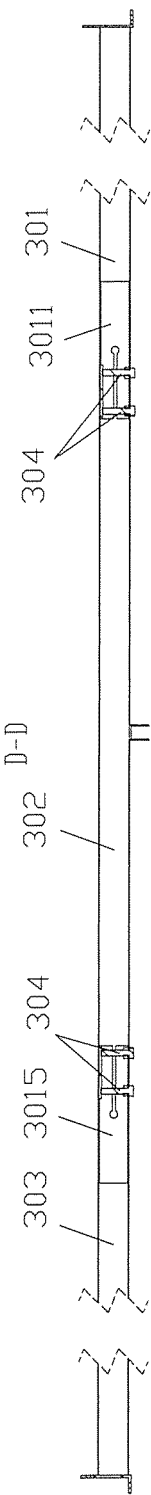
FIG. 3 is a sectional view along Line D-D in FIG. 2.
Figure 4:
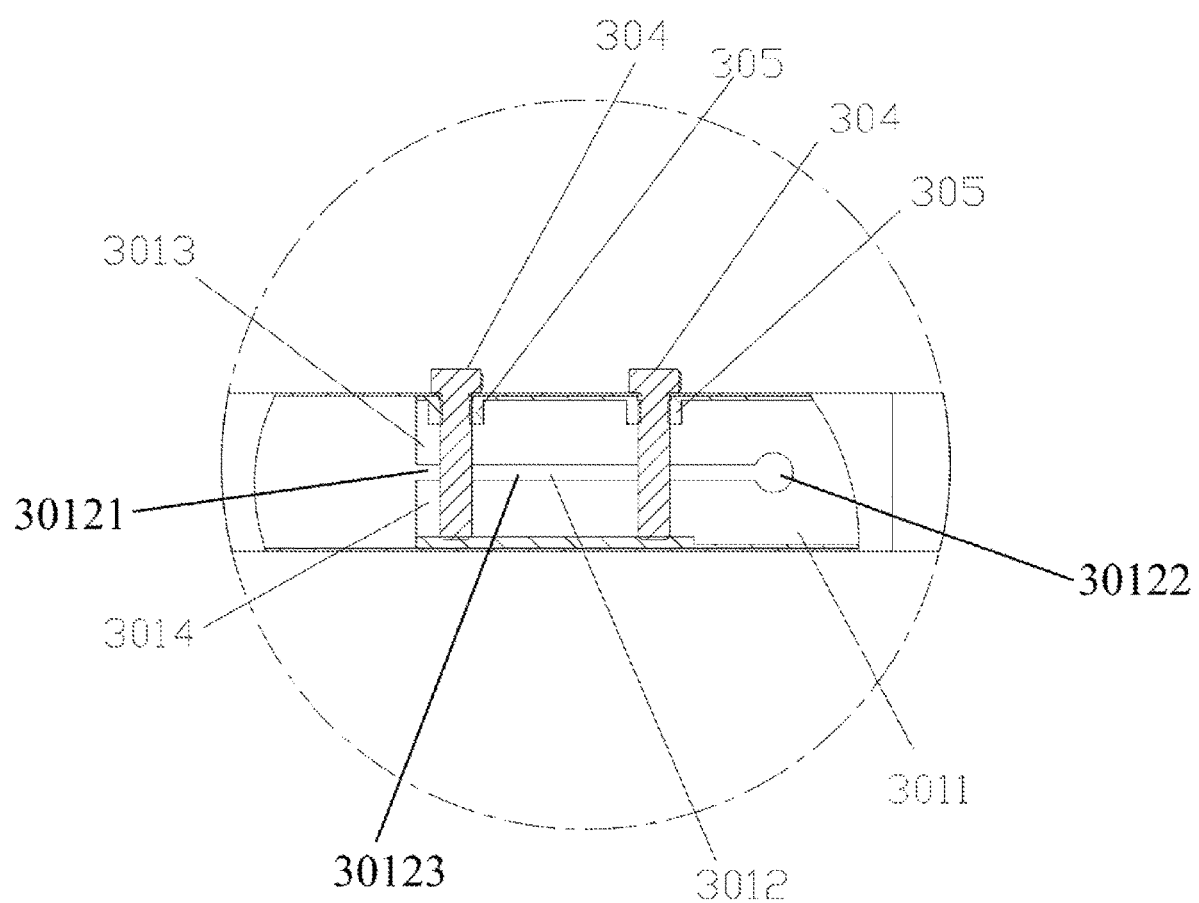
FIG. 4 is an enlarged view of part III in FIG. 1.
Figure 5:
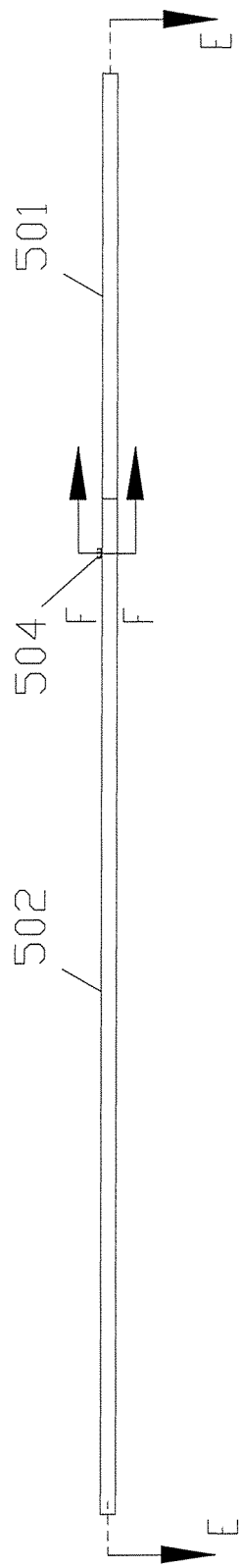
FIG. 5 is a main view of a multiple rod linkage structure of Embodiment 2.
Figure 6:
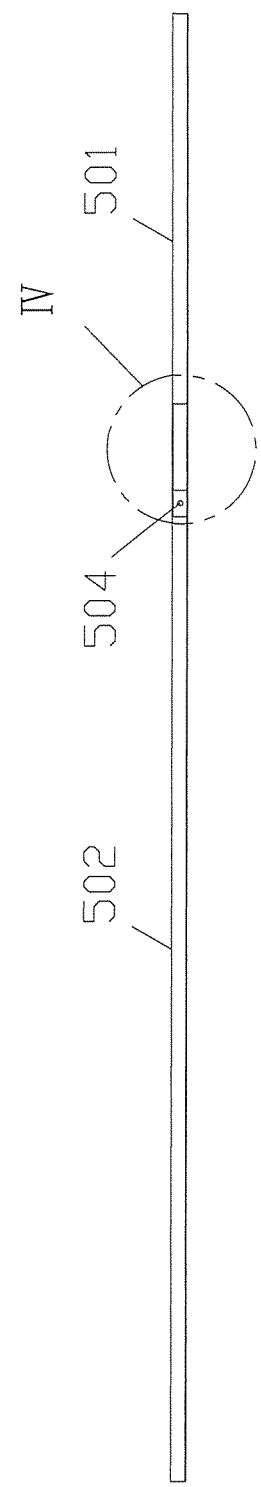
FIG. 6 is a sectional view along Line E-E in FIG. 5.

As shown in FIG. 4, the rod strip opening 3012 includes a first end of the rod strip opening 30121, a second end of the rod strip opening 30122 and a major part of the rod strip opening 30123. The first end of the rod strip opening 30121 is open and the second end of the rod strip opening 30122 is close, the major part of the rod strip opening 30123 is between the first end of the rod strip opening 30121 and the second end of the rod strip opening 30122; width of the second end of the rod strip opening 30122 is larger than width of the major part of the rod strip opening 30123.

As shown in FIG. 4, the locking element 304 movably passes through a sidewall of the second rod piece 302 and a sidewall of the first rod piece 301 from outside to inside, is screw-thread fitted with a sidewall of the first rod piece 301, and then presses against another sidewall of the first rod piece 301. In this embodiment, the locking element 301 is fixedly provided with a threaded piece 305, the locking element 304 is screw-thread fitted with a threaded piece 305 after it passes through a sidewall of the second rod piece 302 and a sidewall of the first rod piece 301, and then passes through another sidewall opposite to the threaded piece 305.

At the left end of the second rod piece 302, the third rod piece 303 has a rod opening end 3015 sleeved within the second rod piece 302, and similar to the structure of the right end, the rod strip opening 3015 of the left end of the second rod piece 302 also is connected with the third rod piece 303 via a locking element 304.

The first rod piece 301, the second rod piece 302 and the third rod piece 303 are all rectangular tubes, the number of the rod strip openings 3012 is two, and the two rod strip openings 3012 divide the sidewall of the rod opening end 3011 into a first U-shaped edge part 3013 and a second U-shaped edge part 3014 which are opposite; the threaded piece 305 is fixedly provided on the first U-shaped edge part 3013.

The locking element 304 passes through the first U-shaped edge part 3013 along a direction parallel to a sidewall of the rectangular tube, is fitted with the threaded piece 305, passes through the threaded piece 305, and thereafter presses against the second U-shaped edge part 3014, as shown in FIG. 4.

The locking element 304 employs a bolt, the threaded piece 305 is a nut, and the nut is directly welded to the rod opening end 3011 of the first rod piece 301. Furthermore, two locking elements 304 are spaced provided in the length direction of the rod opening end 3011. By employing two locking elements 304, it enables the connection of the first rod piece 301 and the second rod piece 302 to be firmer, with better strength and rigidity, and not prone to be bent and broken. Likewise, two locking elements 304 are spaced provided in the length direction of the rod opening end 3015 to connect the second rod piece 302 and the third rod piece 303.

The multiple rod linkage structure of this embodiment may serve as a beam, a stand column or a top rod of a tent, such that the tent is convenient to assembly, with smaller packaging volume after being disassembled, and convenient for transport and storage.

Embodiment 2

The multiple rod linkage structure of the present embodiment, comprises a first rod piece 501 and a second rod piece 502, the first rod piece 501 has a rod opening end 5011 sleeved within the second rod piece 502, and a rod strip opening 5012 is opened on a sidewall of the rod opening end 5011; a locking element 504 is connected between the first rod piece 501 and the second rod piece 502.

Figure 8:
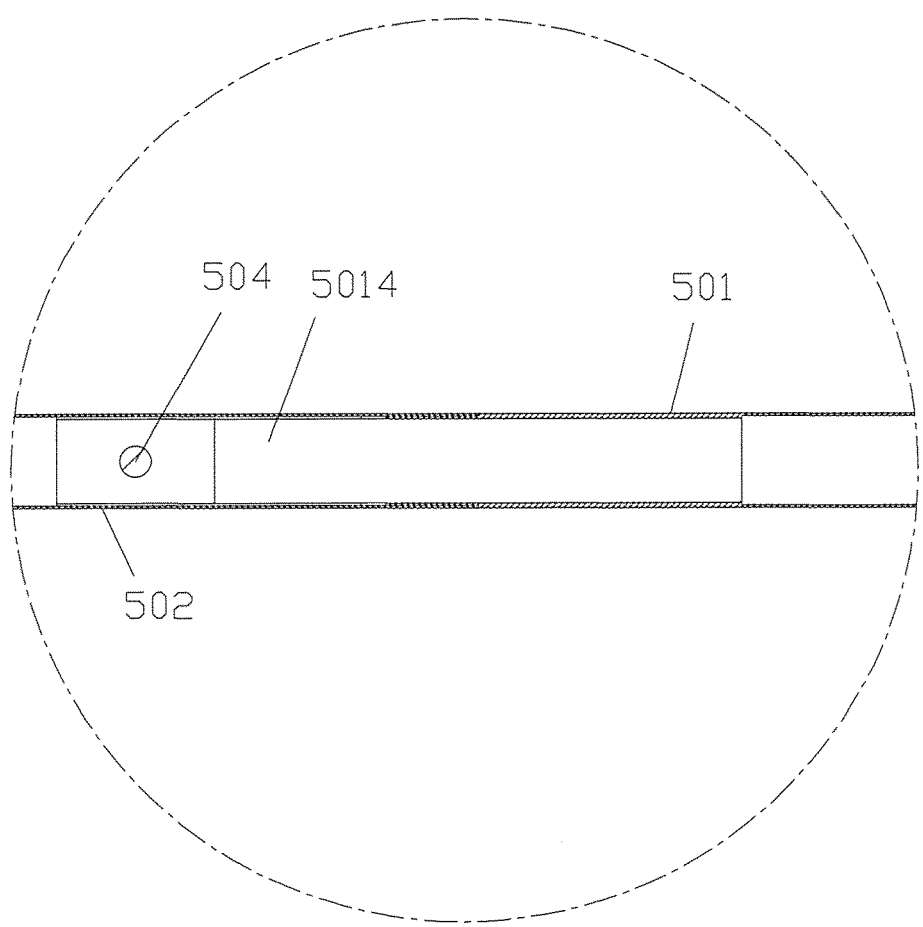
FIG. 8 is an enlarged view of part IV in FIG. 7.
Figure 9:
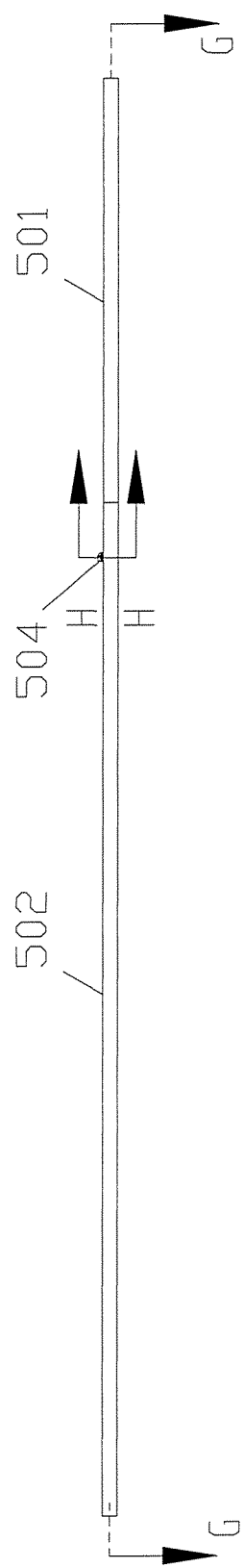
FIG. 9 is a main view of a multiple rod linkage structure of Embodiment 3.
Figure 10:
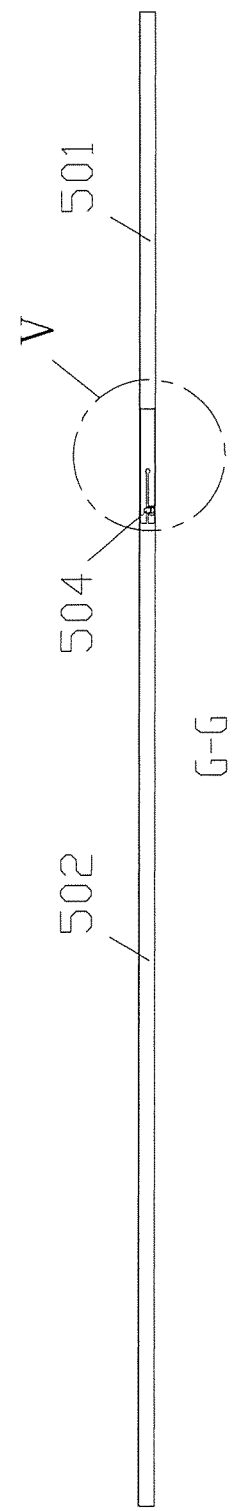
FIG. 10 is a sectional view along Line G-G in FIG. 9.
Figure 11:
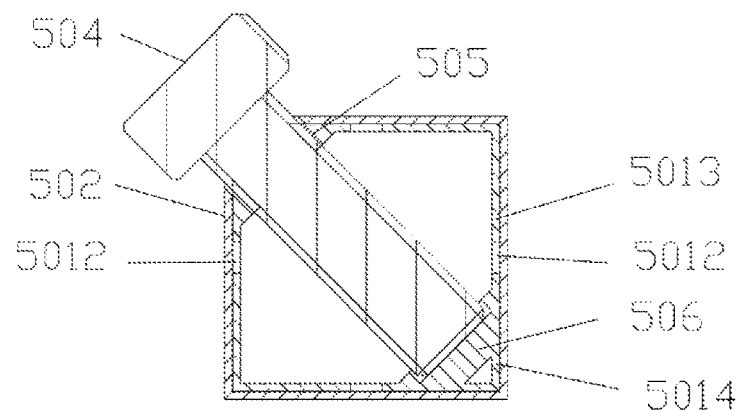
FIG. 11 is an enlarged sectional view along Line H-H in FIG. 9.

As shown in FIG. 8, the locking element 504 movably passes through a sidewall of the second rod piece 502 and a sidewall of the first rod piece 501 from outside to inside, is screw-thread fitted with a sidewall of the first rod piece 501, and then presses against another sidewall of the first rod piece 501.

Figure 7:
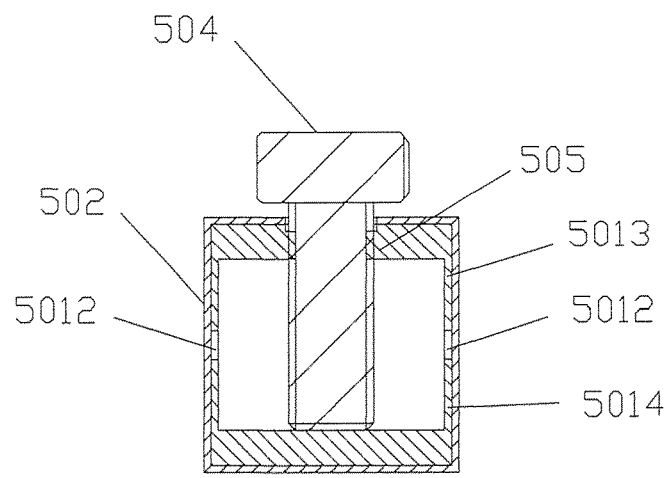
FIG. 7 is a sectional view along Line F-F in FIG. 5.

In the present embodiment, both the first rod piece 501 and the second rod piece 501 are rectangular tubes, and on the rod opening end 5011, the number of the rod strip openings 5012 is two, the two rod strip openings 5012 divide the sidewall of the rod opening end 5011 into a first U-shaped edge part 5013 and a second U-shaped edge part 5014 which are opposite. In the present embodiment, as shown in FIG. 7, the locking element 504 passes through the first U-shaped edge part 5013 along a direction parallel to a sidewall of the rectangular tube, is fitted with the threaded hole 505 of the first U-shaped edge part 5013, and then presses against the second U-shaped edge part 5014.

Embodiment 3

The multiple rod linkage structure of the present embodiment is substantially the same to that of Embodiment 2, by differing in that: as shown in FIGS. 9-12, in the present embodiment, the locking element 504 passes through a hole on a corner of the second rod piece 502, and through the first U-shaped edge part 5013 along a diagonal direction of the rectangular tube, is screw-thread fitted with the first U-shaped edge part 5013, and then presses against the second U-shaped edge part 5014; the threaded hole 505 is opened on a corner of the first U-shaped edge part 5013; a stopper 506 against the locking element 504 is further provided on a corner of the second U-shaped edge part 5014 opposite to the threaded hole 505.

Figure 12:
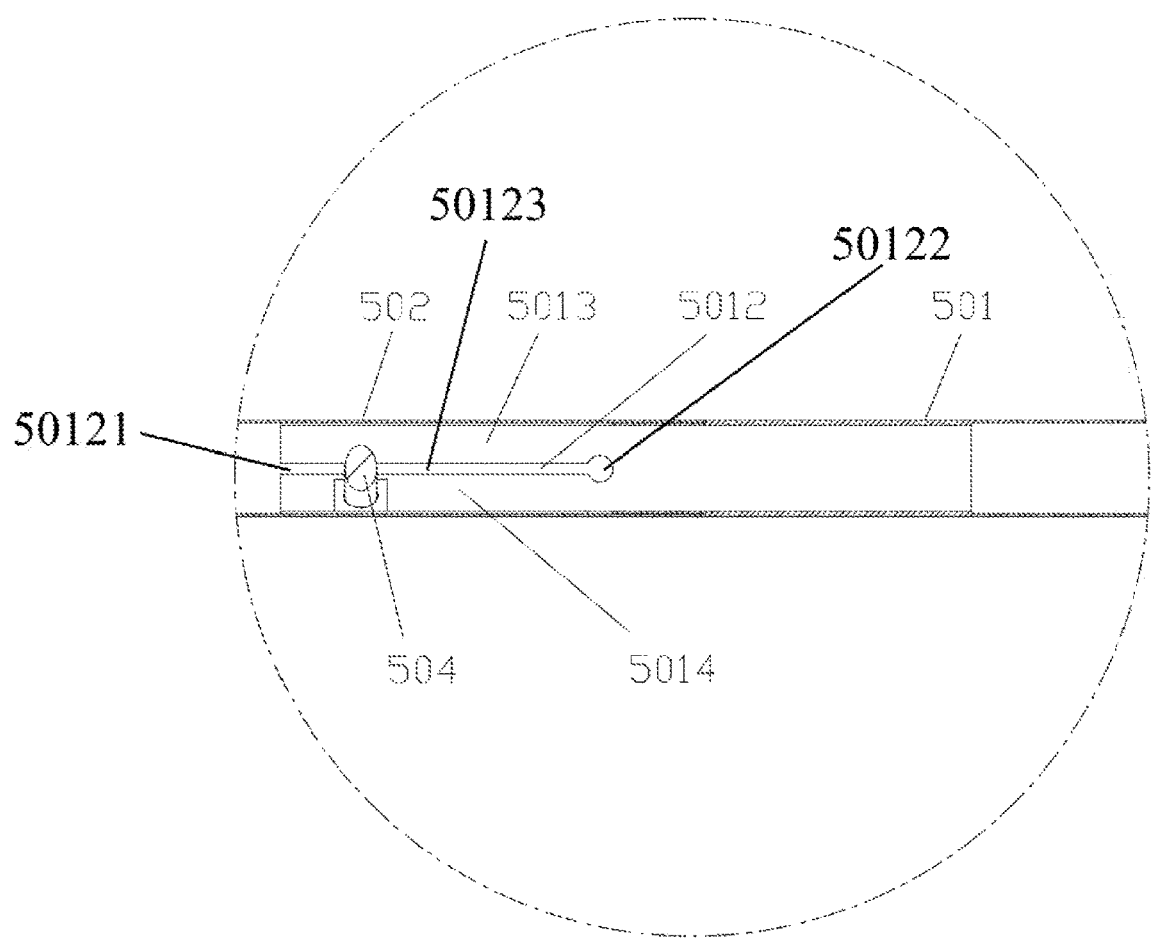
FIG. 12 is an enlarged view of part V in FIG. 11.
Figure 13:
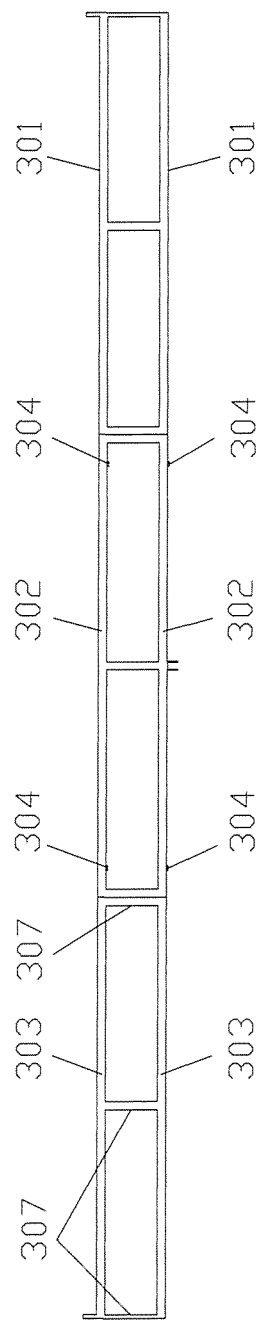
FIG. 13 is a main view of a multiple rod linkage structure of Embodiment 4.
Figure 14:
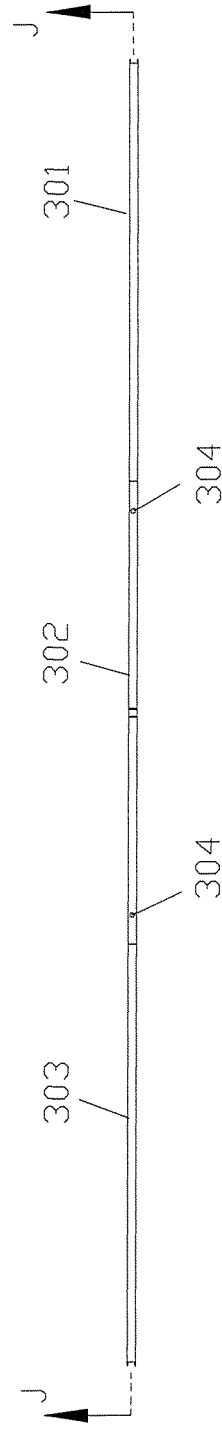
FIG. 14 is a top view of a multiple rod linkage structure of Embodiment 4.
Figure 15:
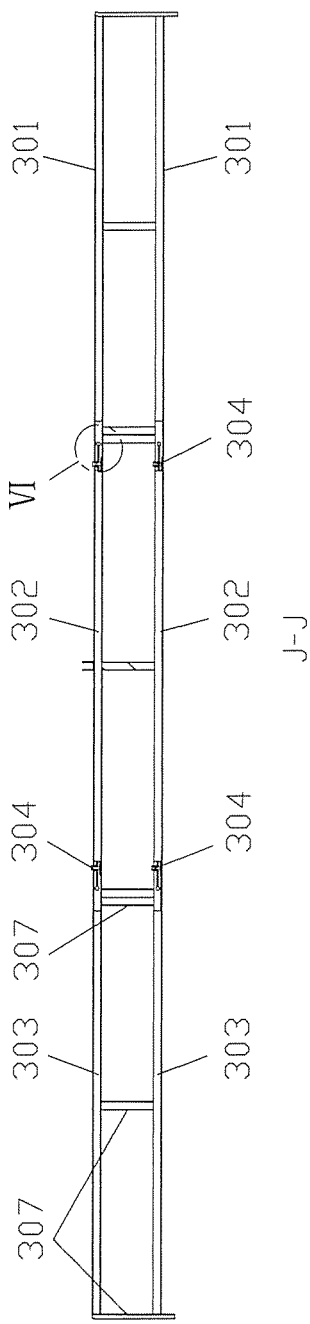
FIG. 15 is a sectional view along Line J-J in FIG. 14.

As shown in FIG. 12, the rod strip opening 5012 includes a first end of the rod strip opening 50121, a second end of the rod strip opening 50122 and a major part of the rod strip opening 50123. The first end of the rod strip opening 50121 is open and the second end of the rod strip opening 50122 is close, the major part of the rod strip opening 50123 is between the first end of the rod strip opening 50121 and the second end of the rod strip opening 50122; width of the second end of the rod strip opening 50122 is larger than width of the major part of the rod strip opening 50123.

Embodiment 4

The multiple rod linkage structure of the present embodiment is substantially the same to that of Embodiment 1, by differing in that: as shown in FIGS. 13-16, in the present embodiment, the first rod piece 301, the second rod piece 302 and the third rod piece 303 are all in groups of two, the two first rod pieces 301 in the same group are arranged in parallel and fixedly connected via three upright rods 307, the two second rod pieces 302 in the same group are arranged in parallel and fixedly connected via three upright rods 307, and the two third rod pieces 303 in the same group are arranged in parallel and fixedly connected via three upright rods 307; the first rod piece 301, the second rod piece 302 and the third rod piece 303 located above are connected together, and the first rod piece 301, the second rod piece 302 and the third rod piece 303 located below are connected together.

Figure 16:
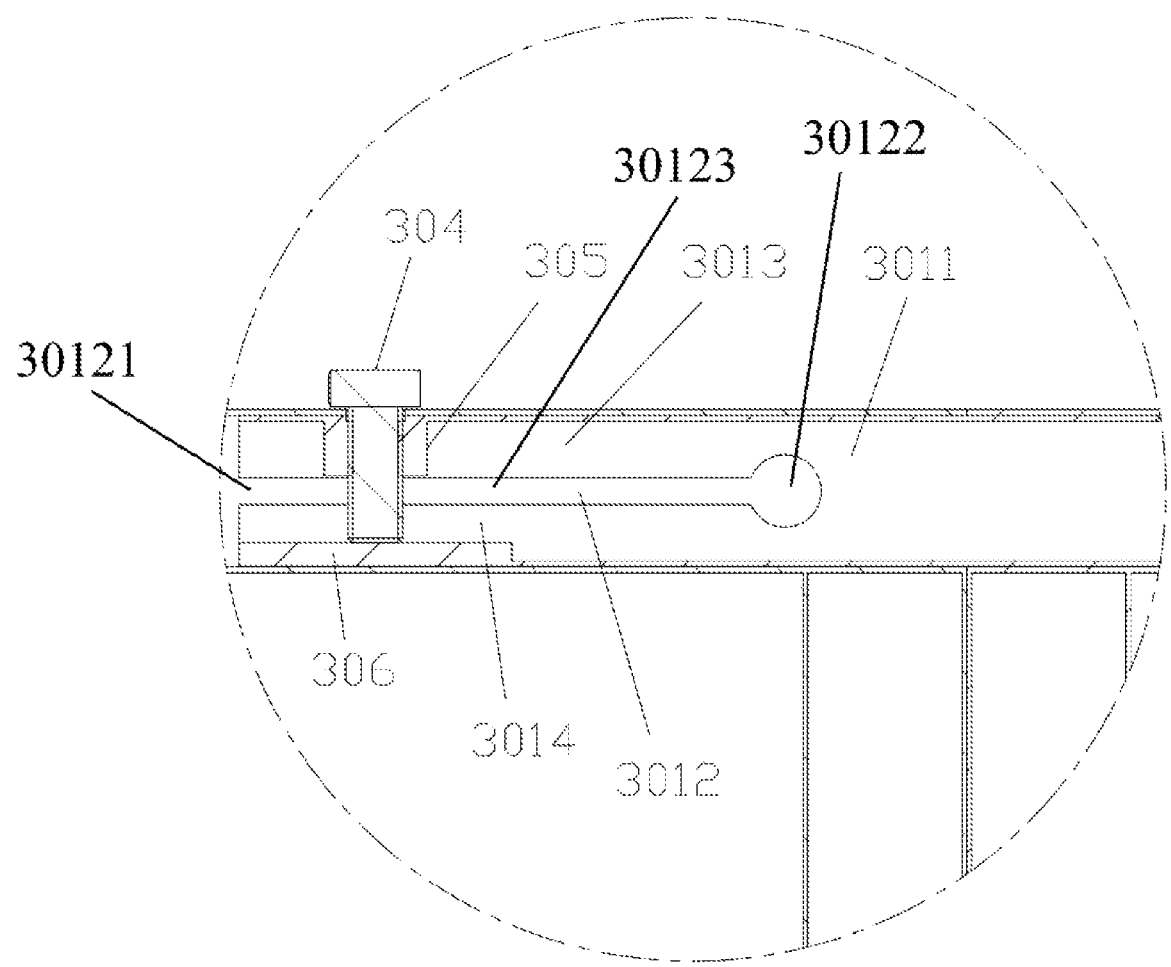
FIG. 16 is an enlarged view of part VI in FIG. 15.

As shown in FIG. 16, the rod strip opening 3012 includes a first end of the rod strip opening 30121, a second end of the rod strip opening 30122 and a major part of the rod strip opening 30123. The first end of the rod strip opening 30121 is open and the second end of the rod strip opening 30122 is close, the major part of the rod strip opening 30123 is between the first end of the rod strip opening 30121 and the second end of the rod strip opening 30122; width of the second end of the rod strip opening 30122 is larger than width of the major part of the rod strip opening 30123.

The rod opening end 3011 of the first rod piece 301 and the second rod piece 302 are connected only via one locking element 304. The rod opening end 3015 of the third rod piece 303 and the second rod piece 302 are connected only via one locking element 304.

Wherein, the second U-shaped edge part of the rod opening end 3011 is provided with a stopper 306 pressing against the locking element 304.

The multiple rod linkage structure of the present embodiment employs a dual beam design, which further improves the strength, and when being used as beams in a tent, it may further lead to a firmer assembled tent.

Embodiment 5

Figure 17:
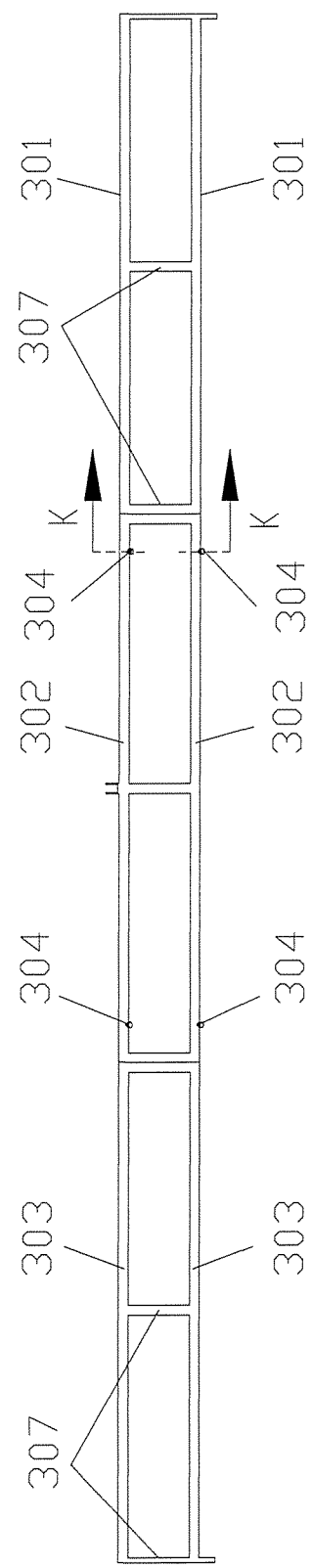
FIG. 17 is a main view of a multiple rod linkage structure of Embodiment 5.
Figure 18:
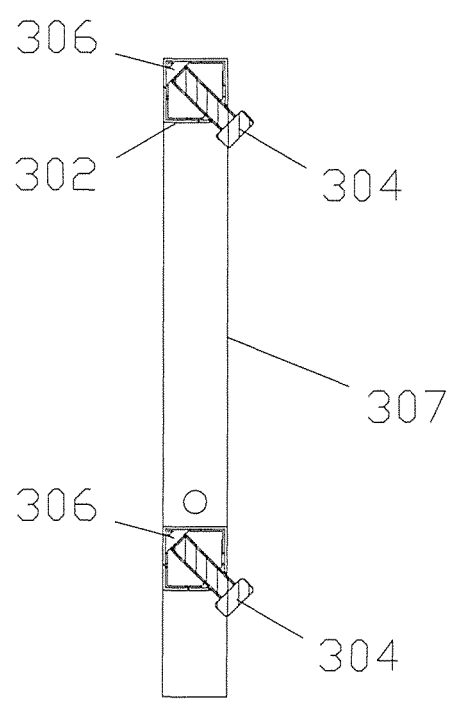
FIG. 18 is an enlarged sectional view along Line K-K in FIG. 17.
Figure 19:
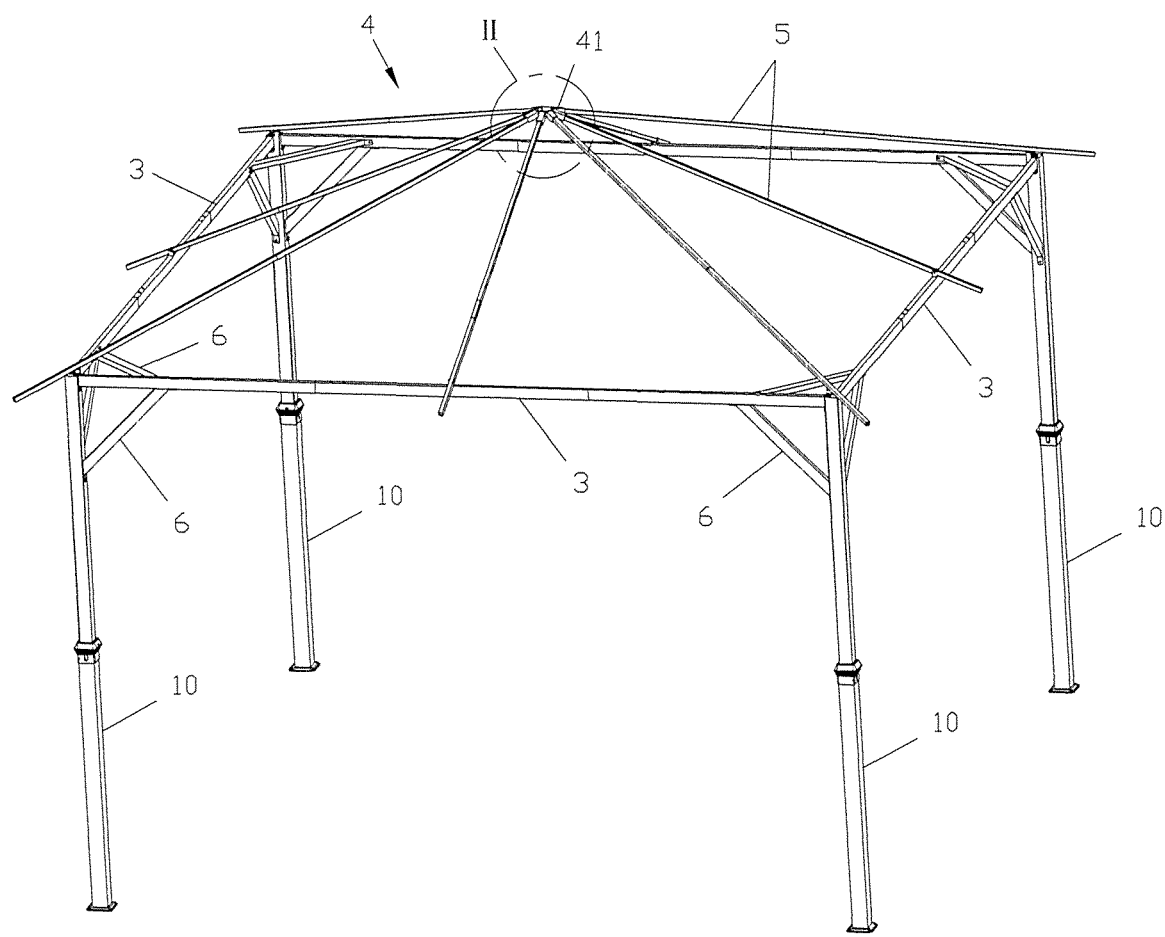
FIG. 19 is a space view of a tent (without covering fabric) of Embodiment 6.
Figure 20:
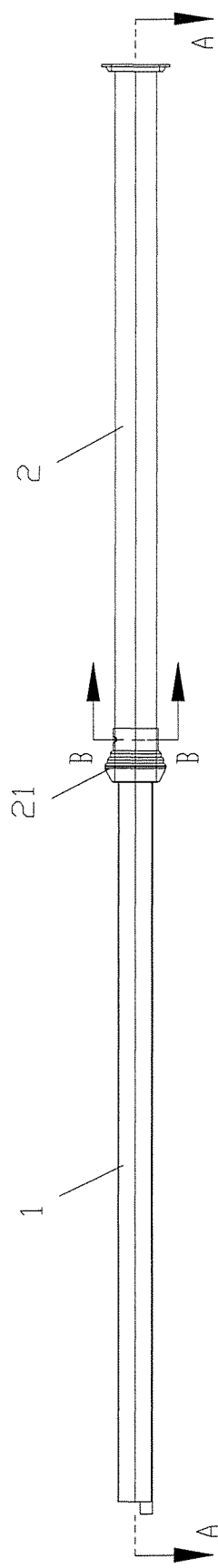
FIG. 20 is a main view of a first stretchable stand column in Embodiment 6.
Figure 21:
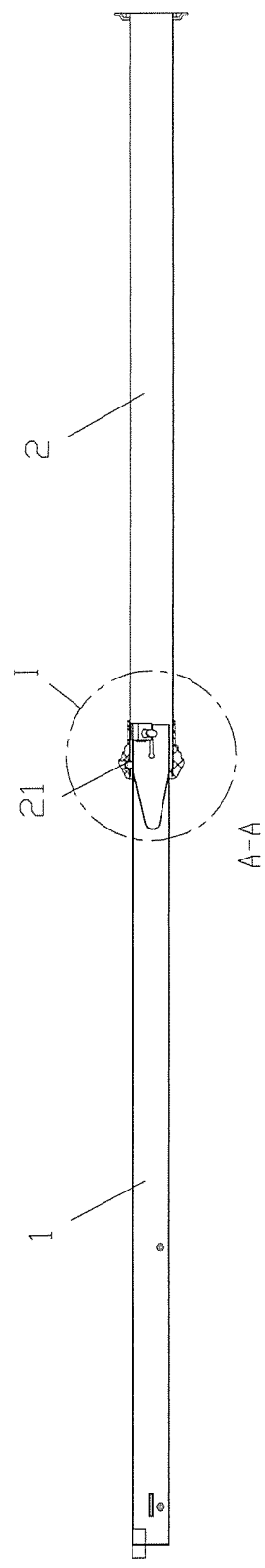
FIG. 21 is a sectional view along Line A-A in FIG. 20.
Figure 22:
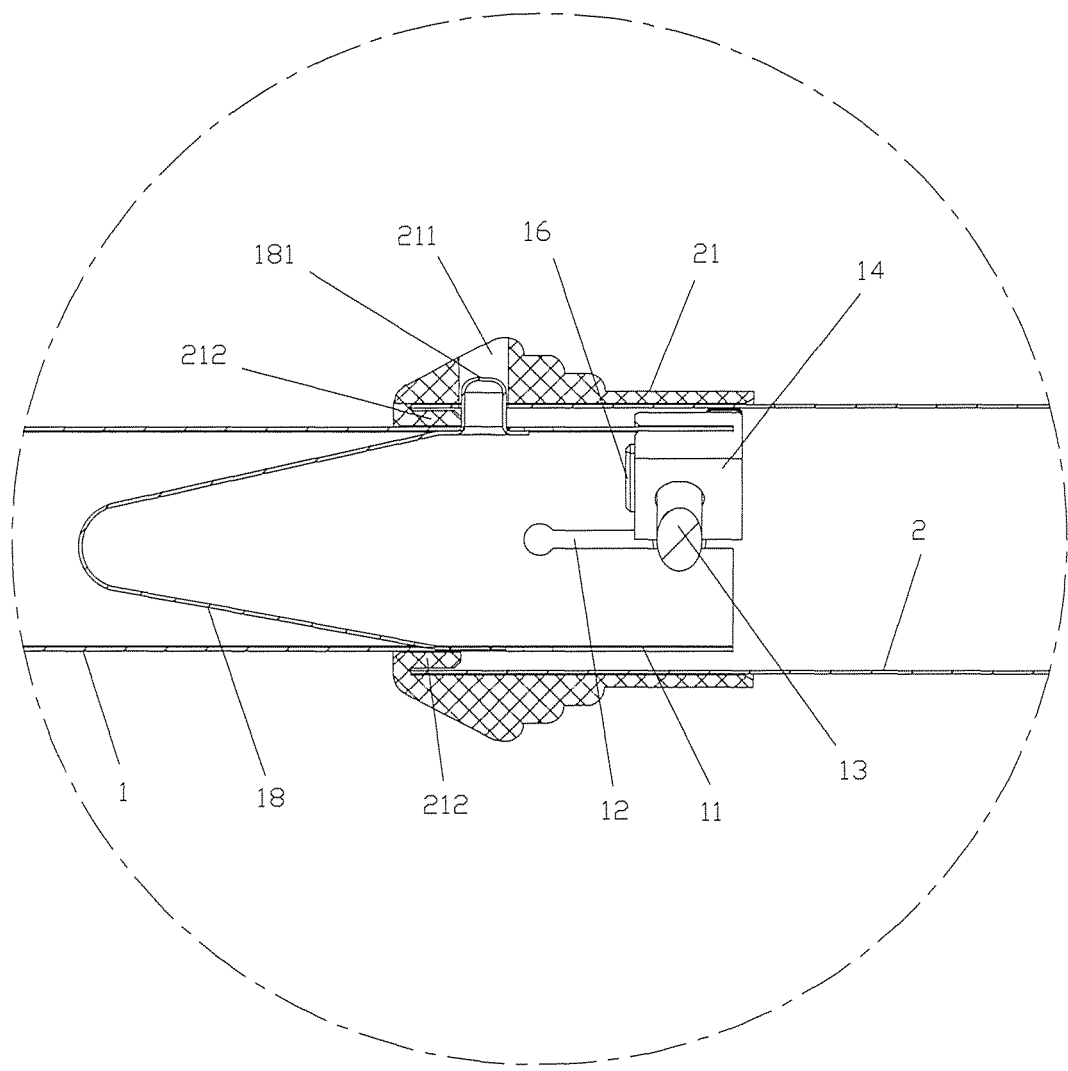
FIG. 22 is an enlarged view of part I in FIG. 21.

The multiple rod linkage structure of the present embodiment is substantially the same to that of Embodiment 4, by differing in that: as shown in FIGS. 17-18, in the present embodiment, the locking element 304 passes through a hole on a corner of the second rod piece 302, and through the first U-shaped edge part 3013 along a diagonal direction of the rectangular tube, is screw-thread fitted with the first U-shaped edge part 3013, and then presses against the second U-shaped edge part 3014; the threaded hole 305 fitted with the locking element 304 is opened on a corner of the first U-shaped edge part 3013; a stopper 306 against the locking element 304 is provided on a corner of the second U-shaped edge part 3014 opposite to the threaded hole 305.

Embodiment 6

Referring to FIGS. 19-25, the present embodiment provides a tent, comprising four stand columns, a beam 3 connected between two stand columns, a top tent frame 4 fixed on the stand columns and the beam 3, and covering fabric.

Wherein, the beam 3 may employ the multiple rod linkage structure according to any one of foregoing Embodiment 1, Embodiment 2 and Embodiment 3. A top rod 5 may employ the multiple rod linkage structure according to any one of foregoing Embodiment 2 and Embodiment 3.

Two stretchable stand columns 10 are connected via one beam 3, and four stretchable stand columns 10 are connected via four beams 3 in proper order to form a cubic frame. The top tent frame 4 is fixed on the cubic frame formed by the stretchable stand columns 10 and the beams 3, and comprises a top connector 41 and a plurality of top rods 5 connected to the top connector 41, an upper end of each top rod 5 being connected to the top connector 41 respectively, each top rod 5 extending aslant downwards; lower ends of some of the plurality of top rods 5 are connected to upper ends of the stretchable stand columns 10, and lower ends of the rest top rods 5 are connected to the beams 3. The number of the top rods 5 are 8, wherein four top rods 5 are connected to the top connector 41 and the upper end of corresponding stretchable stand column 10, respectively, and the other four top rods 5 are connected between the top connector 41 and corresponding beams 3, respectively.

A slanting support rod 6 is provided between each beam 3 and the stretchable stand column 10. Two beams 3 connected to the same stretchable stand column 10 are vertical to each other, and a slanting support rod 6 also is provided between the two beams 3. Two slanting support rod 6 on the same stretchable stand column 10, and the slanting support rod 6 between two beams 3 on this stretchable stand column 10 form a triangle. Connecting the slanting support rods 6 may strengthen the strength of the cubic frame, causing the entire structure more stable.

Wherein, the stand column is a stretchable stand column, and the stretchable stand column 10 includes an inner tube 1 and an outer tube 2 which are muff-coupled, and a locking mechanism fixing the inner tube 1 and the outer tube 2 together. The inner tube 1 has a stand column opening end 11 inserted within the outer tube 2, and a stand column strip opening 12 extending to an opening edge is opened on a sidewall of the inner tube 1.

Figure 23:
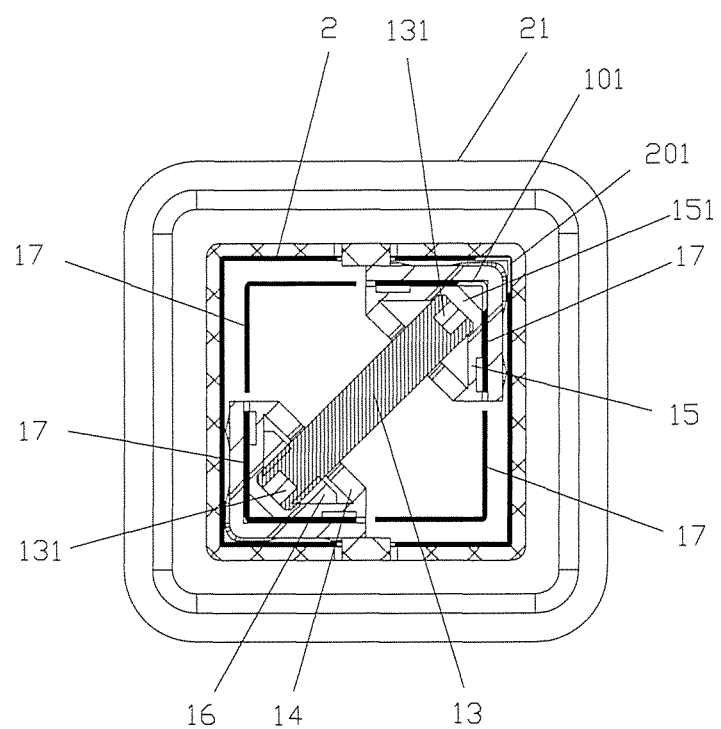
FIG. 23 is an enlarged sectional view along Line B-B in FIG. 20.
Figure 24:
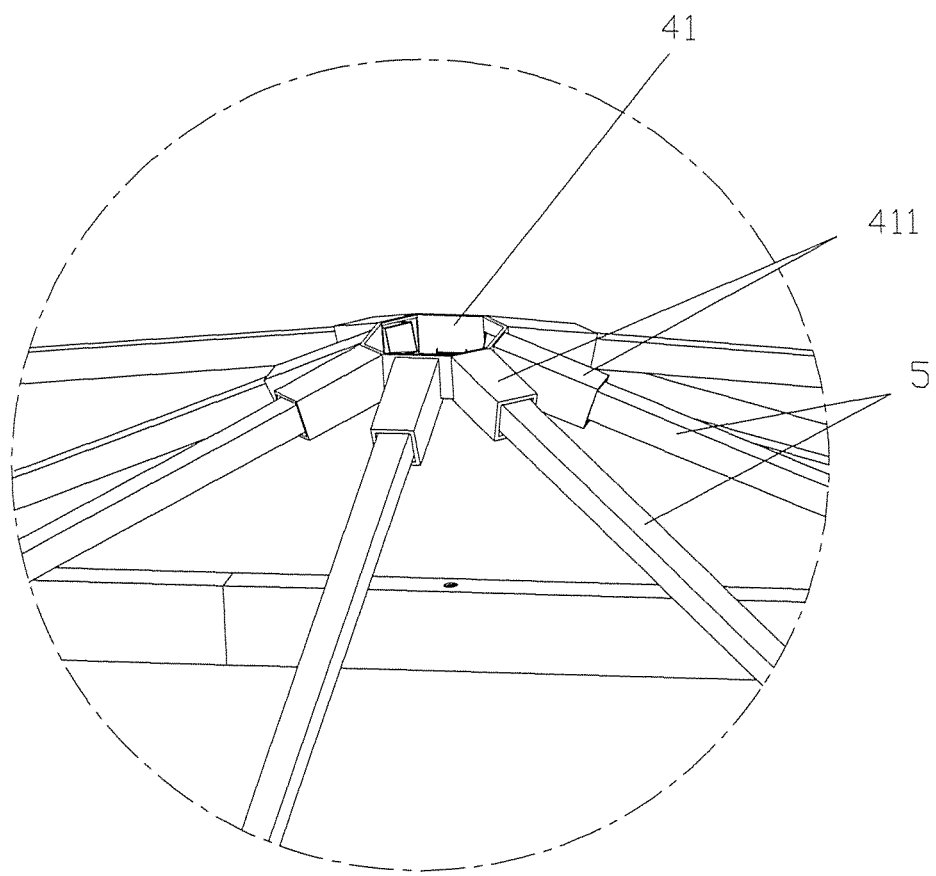
FIG. 24 is an enlarged view of part Ii in FIG. 19.

The locking mechanism includes a screw 13 distending a sidewall of the stand column opening end 11 outwards, two sides of the sidewall of the stand column opening end 11 are fixedly provided with a first stop block 14 and a second stop block 15, respectively, the screw 13 is movably connected between the first stop block 14 and the second stop block 15 along its own axis, and at least one of the first stop block 14 and the second stop block 15 is screw-thread connected with the screw 13. As shown in FIG. 23, both the first stop block 14 and the second stop block 15 are provided with grooves, two ends of the screw 13 movably penetrate the groove of the first stop block 14 and the groove of the second stop block 15 respectively, and in a first stretchable stand column 10, only the groove of the first top block 14 is mounted with an inner threaded piece screw-thread connected with the screw 13.

An operating hole 151 through which an end of the screw 13 passes is opened on the second stop block 15, an operating hole 101 is opened on a sidewall of the inner tube 1 corresponding to the end of the screw 13 penetrating the second stop block 15, an operating hole 201 is opened on a sidewall of the outer tube 2 corresponding to an end of the screw 13 penetrating the second stop block 15, an operating part is provided on the end of the screw 13 corresponding to the operating holes 151, 101 and 201, and in the present embodiment, the operating part is an inner hexagon hole 131. The diameter of the screw 13 should be larger than the diameter of the operating hole 151 on the second stop block 15, to avoid the escape of the screw 13. Moreover, when the screw 13 is twisted tightly, its end portion presses against the second stop block 15 such that the second stop block 15 provides a force bearing point for the screw 13. When the length of the inner tube 1 is adjusted to be aligned with the three operating holes 151, 101 and 201, the screw 13 may be twisted tightly via a Hex wrench inserted to operate the screw 13, to distend the stand column opening end 11 outwards.

A stand column strip opening 12 is opened on a sidewall of the stand column opening end 11, such that the sidewall of the stand column opening end 11 may have a certain open and close effect in the radial direction. The function of the screw 13 makes the sidewall of the stand column opening end 11 may be distended outwards or contracted inwards in a certain degree under the function of the screw 13, to achieve the purpose that the inner tube 1 and the outer tube 2 are pressed tightly and fixed together or loosened.

Both the inner tube 1 and the outer tube 2 are rectangular tubes, stand column strip openings 12 are opened on four surfaces of the sidewall of the inner tube 1 respectively, and the four stand column strip openings 12 divide the sidewall of the opening end of the inner tube 1 into four corners 17, as shown in FIG. 23. The first stop block 14 and the second stop block 15 correspond to two corners 17 fixed on the same diagonal line respectively. Its own axial direction of the screw 13 is provided along the same diagonal line on which the first stop block 14 and the second stop block 15 are located. The operating hole 101 of the inner tube 1 is opened on the corner 17 at which side the second stop block 15 is located.

Both the first stop block 14 and the second stop block 15 are provided with a lock slot fitted with the corners 17. Both the first stop block 14 and the second stop block 15 are divided into an inner part and an outer part by the lock slot, the inner part is located within the inner tube 1, and the outer part is located between the inner tube 1 and the outer tube 2. When the stand column opening end of the inner tube 1 is distended, the friction force generated from the tight pressure between the outer parts of the first stop block 14 and the second stop block 15 and the inner sidewall of the outer tube 2, fixes the inner tube and the outer tube together. In the present embodiment, the first stop block 14 and the second stop block 15 are made of rubber. When installing, the inner threaded piece 16 is placed into the groove of the first stop block 14, the end of the screw 13 having thread penetrates into the first stop block 14 and is screw-threaded connected with the inner threaded piece 16, the other end of the screw 13 penetrates into the second stop block 15, and then the first stop block 14 and the second stop block 15 are blocked into two opposite corners 17 on the stand column opening end 11 of the inner tube 1 via their own lock slots.

For the convenience of positioning when adjusting the stretched position of the inner tube, an elastic positioning element 18 is further provided in the inner tube 1, a through-hole is provided on a sidewall of the inner tube 1, the elastic positioning element 18 has a positioning protrusion 181 movably provided in the through-hole and protruding outwards, and a positioning hole fitted with the positioning protrusion 18 is opened on the sidewall of the outer tube 2. Wherein, the elastic positioning element 18 is a spring sheet of which an end portion presses against the sidewall of the inner tube 1 and another end portion is bent into the positioning protrusion 181 integrally. When the positioning protrusion 181 of the elastic positioning element 18 is fitted with the positioning hole on the outer tube 1, the operating hole 151 on the second stop block 15, the operating hole 101 on the inner tube 1 and the operating hole 201 on the outer tube 2 are aligned to each other, and at this time, the tool may be inserted to operate the screw 13.

The locking mechanism further comprises a shell 21 sleeved over the opening of the outer tube 2, and a positioning assistant hole 211 is opened on the shell 21 corresponding to the positioning hole to receive the positioning protrusion 181. An operating assistant hole is opened on the shell 21 corresponding to the operating hole 201 on the outer tube 2. When operating the inner tube 1 and the outer tube 2, the inner tube 1 and the outer tube 2 are adjusted to suitable lengths, and the positioning protrusion 181 of the elastic positioning piece 18 is popped from the inner tube and blocked in the positioning assistant hole 211. Then, the Hex wrench penetrates into the operating assistant hole on the shell 21, the operating hole 201 on the outer tube 2, the operating hole 101 on the inner tube 1 and the operating hole 151 on the second stop block 15 successively, and when the screw 13 is twisted tightly, the tensile force generated by separating the screw 13 and the inner threaded piece 16 from each other increases to distend the inner tube 1 outwards, such that the inner tube 1 and the outer tube 2 are pressed and fixed together tightly. When loosening the screw 13, the screw 13 gets close to the inner threaded piece 16, the tensile force between them decreases, and the inner tube 1 draws back by itself, and the tight pressure between the inner tube 1 and the outer tube 2 decreases, such that the inner tube 1 and outer tube 2 may be stretchably adjusted.

The shell 21 is provided with a limit part 212 wrapping the opening inward edge of the outer tube 2, when the inner tube 1 stretches out with respect to the outer tube 2, the stop part 212 blocks the positioning protrusion 181 to prevent the inner tube 1 from escaping easily, and only when the positioning protrusion 181 is totally pressed into the inner tube 1, the inner tube 1 can be drawn out from the opening of the outer tube 2. Therefore, during transport, the inner tube 1 and the outer tube 2 may be stretched to the shortest, or the two may be detached, to reduce packaging length.

After the stretchable stand column 10 of the present embodiment stretches to the longest length, the inner tube 1 and the outer tube 2 are located using the elastic positioning piece 18, the stand column opening end 11 of the inner tube 1 is distended outwards by twisting the screw 13 via a tool passing through the locking mechanism, the distended stand column opening end 11 of the inner tube 1 presses against the outer tube 2 such that the inner tube 1 and the outer tube 2 are fitted tightly and fixed together, resulting in more stable structure and more greater bearing capacity of the stretchable stand column 10, which can ensure that the stretchable stand column has more stable supporting effect. When the stretchable stand column 10 is in use, the outer tube 2 may support on the ground, and the inner tube 1 is located above; or the inner tube 1 may support on the ground, and the outer tube 2 is located above.

Figure 25:
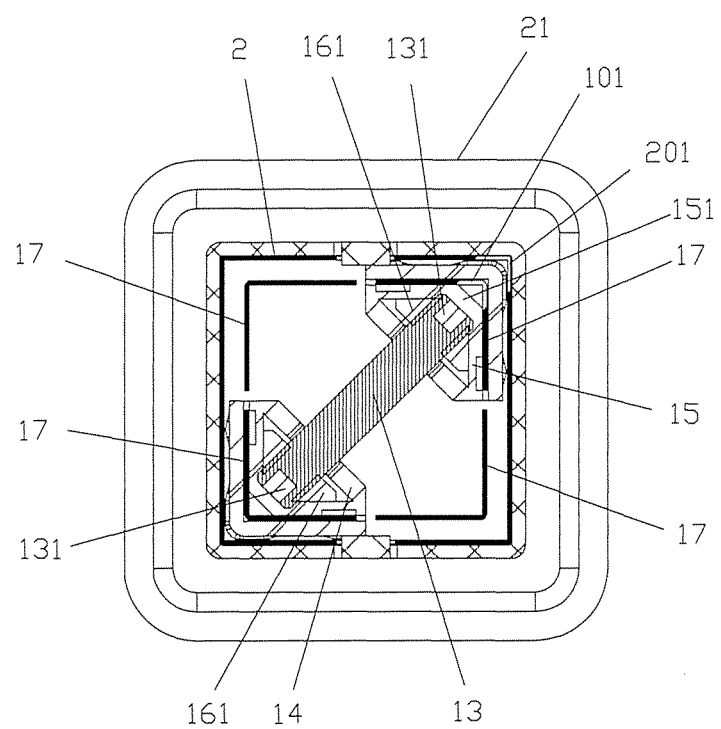
FIG. 25 is a schematic sectional view of a second stretchable stand column in Embodiment 6.

As shown in FIG. 25, the locking mechanism of the stretchable stand column may further employ the following structure: in the stretchable stand column 10, both the first stop block 14 and the second stop block 15 are provided with grooves, two ends of the screw 13 movably penetrate into the groove of the first stop block 14 and the groove of the second stop block 15 respectively, a first inner threaded piece 161 is provided within the groove of the first stop block 14, a second inner threaded piece 162 is provided within the groove of the second stop block 15, an end of the screw 13 is screw-thread connected with the first inner threaded piece 161, and the other end of the screw 13 is screw-thread connected with the second inner threaded piece 162, and the directions of the spiral lines on the two ends of the screw 13 are opposite. Due to that the directions of the spiral lines on the two ends of the screw 13 are opposite, the first inner threaded piece 161 and the second inner threaded piece 162 move in opposite directions when twisting the screw 13, that is, the first inner threaded piece 161 and the second inner threaded piece 162 keep away from each other or get close to each other. When twisting the screw 13 tightly, the first inner threaded piece 161 and the second inner threaded piece 162 keep away from each other and respectively push the first stop block 14 and the second stop block 15 to be away from each other, such that the stand column opening end 11 of the inner tube 1 is distended and gets locked and fixed with the outer tube 2. When loosening the screw 13, the first inner threaded piece 161 and the second inner threaded piece 162 get close to each other such that the stand column opening end 11 of the inner tube 1 is released from the outer tube 2, and the inner tube 1 may be drawn back into or detached from the outer tube 2.

Embodiment 7

Figure 26:
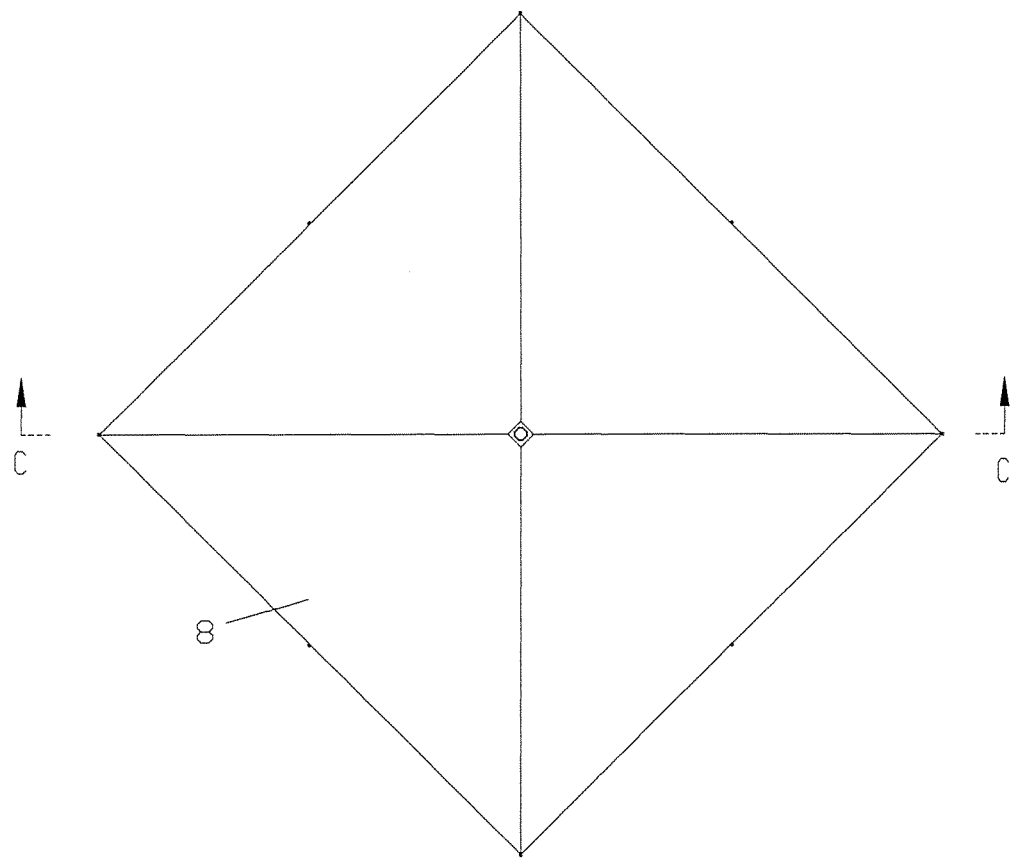
FIG. 26 is a top view of a tent of Embodiment 7.
Figure 27:
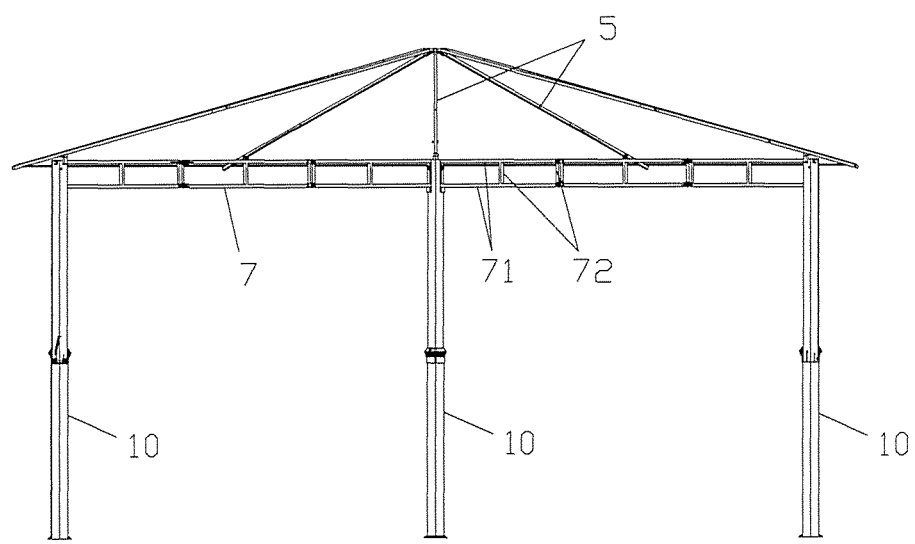
FIG. 27 is a sectional view along Line C-C in FIG. 26.

As shown in FIGS. 26 and 27, the tent of the present embodiment is substantially the same with that of Embodiment 6, by differing in that: the slanting support rods 6 are removed; the beams 3 employ the multiple rod linkage structure in Embodiment 4 or 5. That is, the beam 3 of the present embodiment is dual beam strengthened structure.

The upright rod 307 of the two ends of the beam 3 is fixedly connected with the upper end of the stretchable stand column via a bolt. The installation of the tent may be achieved only by two person, firstly the stretchable stand columns 10 are installed and stretched to the shortest length, the beams 3 then are connected between the stretchable stand columns 10 to form a cubic frame, the assembled top tent frame 4 is installed onto the cubic frame, and then the covering fabric 8 is covered onto the frame, and then the stretchable stand columns 10 are stretched out and locked via the locking mechanism, that is, the tent is assembled, and the assembly is very convenient. Due to that each stretchable stand column 10 is detachable, and the beams 3 and the top rods 5 also can be detached into parts with shorter lengths, it largely reduces the packaging volume, and is convenient for transport and storage.

The embodiments described above are only for illustrating the technical concepts and features of the present disclosure, and intended to make those skilled in the art being able to understand the present disclosure and thereby implement it, and should not be concluded to limit the protective scope of this disclosure. Any equivalent variations or modifications according to the spirit of the present disclosure should be covered by the protective scope of the present disclosure.

The invention claimed is:

1. A multiple rod linkage structure, comprising at least a first rod piece and a second rod piece which are muff-coupled, wherein, the first rod piece has a rod opening end sleeved within the second rod piece, and a rod strip opening is opened on a sidewall of the rod opening end, a first end of the rod strip opening is open and a second end of the rod strip opening is close, a major part of the rod strip opening is between the first end of the rod strip opening and the second end of the rod strip opening; a width of the second end of the rod strip opening is larger than a width of the major part of the rod strip opening; a locking element is connected between the first rod piece and the second rod piece, movably passes through a sidewall of the second rod piece and a sidewall of the first rod piece from outside to inside, is screw-thread fitted with a sidewall of the first rod piece, and then presses against another sidewall of the first rod piece.

2. The multiple rod linkage structure according to claim 1, wherein, both the first rod piece and the second rod piece are rectangular tubes, the number of the rod strip openings is two, and the two rod strip openings divides the rod opening end into a first U-shaped edge part and a second U-shaped edge part which are opposite.

3. The multiple rod linkage structure according to claim 2, wherein, the locking element passes through the first U-shaped edge part along a direction parallel to a sidewall of the rectangular tube and thereafter presses against the second U-shaped edge part.

4. The multiple rod linkage structure according to claim 2, wherein, the locking element passes through the first U-shaped edge part along a diagonal direction of the rectangular tube and thereafter presses against the second U-shaped edge part.

5. The multiple rod linkage structure according to claim 1, wherein, both the first rod piece and the second rod piece are in groups of two, the two first rod pieces in the same group are provided in parallel and fixedly connected via at least two upright rods, and the two second rod pieces in the same group are provided in parallel and fixedly connected via at least two upright rods.

6. The multiple rod linkage structure according to claim 1, wherein, the locking element is a bolt.

7. A tent, comprising at least three stand columns, a beam connected between two stand columns, a top tent frame fixed on the stand columns and the beam, and covering fabric, wherein, the beam employs the multiple rod linkage structure according to claim 1.

8. The tent according to claim 7, wherein, the stand column is stretchable stand column, and the stretchable stand column comprises an inner tube and outer tube which are muff-coupled, as well as a locking mechanism for fixing the inner tube and the outer tube together, the inner tube has a stand rod opening end inserted within the outer tube, and a stand column strip opening extending to an opening edge is opened on a sidewall of the inner tube; the locking mechanism comprises a screw distending a sidewall of the stand column opening end outwards, a first stop block and a second stop block are fixedly provided on two sides of the sidewall of the stand column opening end respectively, the screw is movably connected between the first stop block and the second stop block along its own axial direction, and at least one of the first stop block and the second stop block is connected with the thread of the screw; operating holes corresponding to the same end of the screw are opened on sidewalls of the inner tube and the outer tube respectively, and an operating part is provided at least on one end portion of the screw corresponding to the operating holes.

9. The tent according to claim 8, wherein, an elastic positioning element is further provided in the inner tube, a through-hole is provided on a sidewall of the inner tube, the elastic positioning element has a positioning protrusion movably provided in the through-hole and protruding outwards, and a positioning hole fitted with the positioning protrusion is opened on the sidewall of the outer tube.

10. A tent, comprising at least three stand columns, a beam connected between two stand columns, a top tent frame fixed on the stand columns and the beam, and covering fabric, wherein, the top tent frame comprises a top connector and a plurality of top rods connected to the top connector, and both the beam and the top rod employ the multiple rod linkage structure according to claim 1.

* * * * *